US011994678B2

(12) United States Patent
Lin

(10) Patent No.: US 11,994,678 B2
(45) Date of Patent: May 28, 2024

(54) IMAGE GENERATION UNIT COMPRISING A REFLECTING MIRROR DISPOSED BETWEEN A FIRST AND A SECOND ILLUMINATION SYSTEM AND HEAD-UP DISPLAY

(71) Applicant: Coretronic Corporation, Hsin-Chu (TW)

(72) Inventor: Shih-Yi Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/939,902

(22) Filed: Sep. 7, 2022

(65) Prior Publication Data
US 2023/0113611 A1 Apr. 13, 2023

Related U.S. Application Data

(60) Provisional application No. 63/253,549, filed on Oct. 8, 2021.

(30) Foreign Application Priority Data

Dec. 24, 2021 (CN) .......................... 202111594615.8

(51) Int. Cl.
*G02B 27/01* (2006.01)
*G02F 1/1335* (2006.01)
*G02F 1/13357* (2006.01)

(52) U.S. Cl.
CPC ... *G02B 27/0101* (2013.01); *G02F 1/133504* (2013.01); *G02F 1/1336* (2013.01)

(58) Field of Classification Search
CPC ...... G02B 2027/015; G02B 2027/0161; G02B 27/0916
See application file for complete search history.

(56) References Cited

U.S. PATENT DOCUMENTS 9,291,819 B2   3/2016 Ferri
2019/0012552 A1* 1/2019 Lambert .............. G06V 20/597
(Continued)

FOREIGN PATENT DOCUMENTS

CN      109425977 A  *  3/2019  ............. G02B 17/06
CN      109581667 A  *  4/2019
(Continued)

OTHER PUBLICATIONS

"Search Report of Europe Counterpart Application", dated Feb. 17, 2023, pp. 1-8.

*Primary Examiner* — Paul C Lee
(74) *Attorney, Agent, or Firm* — JCIPRNET

(57) ABSTRACT

An image generation unit includes a display panel, a first illumination system, and a second illumination system. The display panel has a first and a second imaging regions adjacently arranged and located on the same plane. The first illumination system provides a first light beam incident on the first imaging region at a first incident angle. The first imaging region converts the first light beam into a first image beam. The second illumination system provides a second light beam incident on the second imaging region at a second incident angle. The second imaging region converts the second light beam into a second image beam. The optical paths of the first light beam and the second light beam do not intersect with each other. The first image beam and the second image beam leave the display panel at different light exit angles.

18 Claims, 3 Drawing Sheets

(56) References Cited

U.S. PATENT DOCUMENTS

| | | | |
|---|---|---|---|
| 2020/0033600 A1* | 1/2020 | Kweon | ................ G02B 17/02 |
| 2020/0117014 A1 | 4/2020 | Mikkelsen et al. | |
| 2021/0011286 A1 | 1/2021 | Morohashi et al. | |
| 2022/0187646 A1* | 6/2022 | Jin | .................... G02B 27/0101 |

FOREIGN PATENT DOCUMENTS

| | | |
|---|---|---|
| CN | 107357040 | 9/2020 |
| EP | 3451045 | 3/2019 |
| EP | 3608703 | 2/2020 |
| TW | I582465 | 5/2017 |
| TW | I622504 | 5/2018 |
| TW | I699557 | 7/2020 |
| WO | 2020233530 | 11/2020 |

\* cited by examiner

IMAGE GENERATION UNIT COMPRISING A REFLECTING MIRROR DISPOSED BETWEEN A FIRST AND A SECOND ILLUMINATION SYSTEM AND HEAD-UP DISPLAY

CROSS-REFERENCE TO RELATED APPLICATION

This application claims the priority benefit of U.S. provisional application Ser. No. 63/253,549, filed on Oct. 8, 2021, and China application serial no. 202111594615.8, filed on Dec. 24, 2021. The entirety of each of the above-mentioned patent applications is hereby incorporated by reference herein and made a part of this specification.

BACKGROUND

Technical Field

The disclosure relates to an optical device, and more particularly, to an image generation unit and a head-up display.

Description of Related Art

Head-up displays (HUDs) are widely applied to aircraft, vehicles, and retail store windows to show the information superimposed on the surrounding environment to the users. The vehicle may have a built-in head-up display device having a Picture Generation Unit (PGU) and an imaging module disposed therewithin. The information image generated by the PGU is projected outside to the windshield by the imaging module, such that the driver can see the driving information provided by the built-in head-up display device without having to look down at the dashboard or navigator while driving.

With the current technical architecture of the head-up display device, a single picture generation unit may only provide a single field of view (FOV) and generate a single virtual image, which limits the information that the head-up display device can display. Therefore, with the current technology, if a head-up display device is required to provide two fields of view and two virtual images at the same time, two sets of picture generation units must be used, which will increase the volume of the head-up display device. Moreover, since the head-up display device requires two sets of picture generation units, the number of elements required for the head-up display device and the production cost are increased.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an image generation unit and a head-up display, in which two imaging regions are simultaneously arranged with a single image generation unit.

Other objects and advantages of the disclosure can be further understood from the technical features disclosed in the disclosure.

In order to achieve one or part or all of the above purposes or other purposes, the disclosure provides an image generation unit, which includes: a display panel, a first illumination system, and a second illumination system. The display panel has a first imaging region and a second imaging region which are adjacently arranged and located on a same plane. The first illumination system provides a first light beam which is incident on the first imaging region of the display panel at a first incident angle, and the first imaging region converts the first light beam into a first image beam. The second illumination system provides a second light beam which is incident on the second imaging region of the display panel at a second incident angle, and the second imaging region converts the second light beam into a second image beam. The optical path of the first light beam incident on the first imaging region does not intersect with the optical path of the second light beam incident on the second imaging region, and the first image beam and the second image beam leave the display panel at different light exit angles.

The disclosure also provides a head-up display, projecting a first image beam and a second image beam onto a target element, including: an image generation unit, and an image transmission module. The image generation unit includes: a display panel, a first illumination system, and a second illumination system. The display panel has a first imaging region and a second imaging region which are adjacently arranged and located on a same plane. The first illumination system provides a first light beam which is incident on the first imaging region of the display panel at a first incident angle, and the first imaging region converts the first light beam into the first image beam. The second illumination system provides a second light beam which is incident on the second imaging region of the display panel at a second incident angle, and the second imaging region converts the second light beam into the second image beam. An optical path of the first light beam incident on the first imaging region does not intersect with an optical path of the second light beam incident on the second imaging region, and the first image beam and the second image beam leave the display panel at different light exit angles. The image transmission module transmits the first image beam and the second image beam from the image generation unit to the target element so as to form a first virtual image and a second virtual image, respectively.

Based on the above, using this image generation unit architecture, through the design of the illumination system and the light transmission assembly, the function of providing illumination beams to two imaging regions simultaneously by one image generation unit can be achieved, and the two imaging regions have illumination systems that may both provide their respective imaging regions independently, such that the illumination systems of the two imaging regions can have better efficiency performance. Therefore, the overall architecture of the image generation unit and the head-up display has the advantages of smaller size, lower power consumption, lower cost, and the like.

In order to make the above-mentioned features and advantages of the disclosure more obvious and easy to understand, the following embodiments are given and described in detail with the accompanying drawings as follows.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
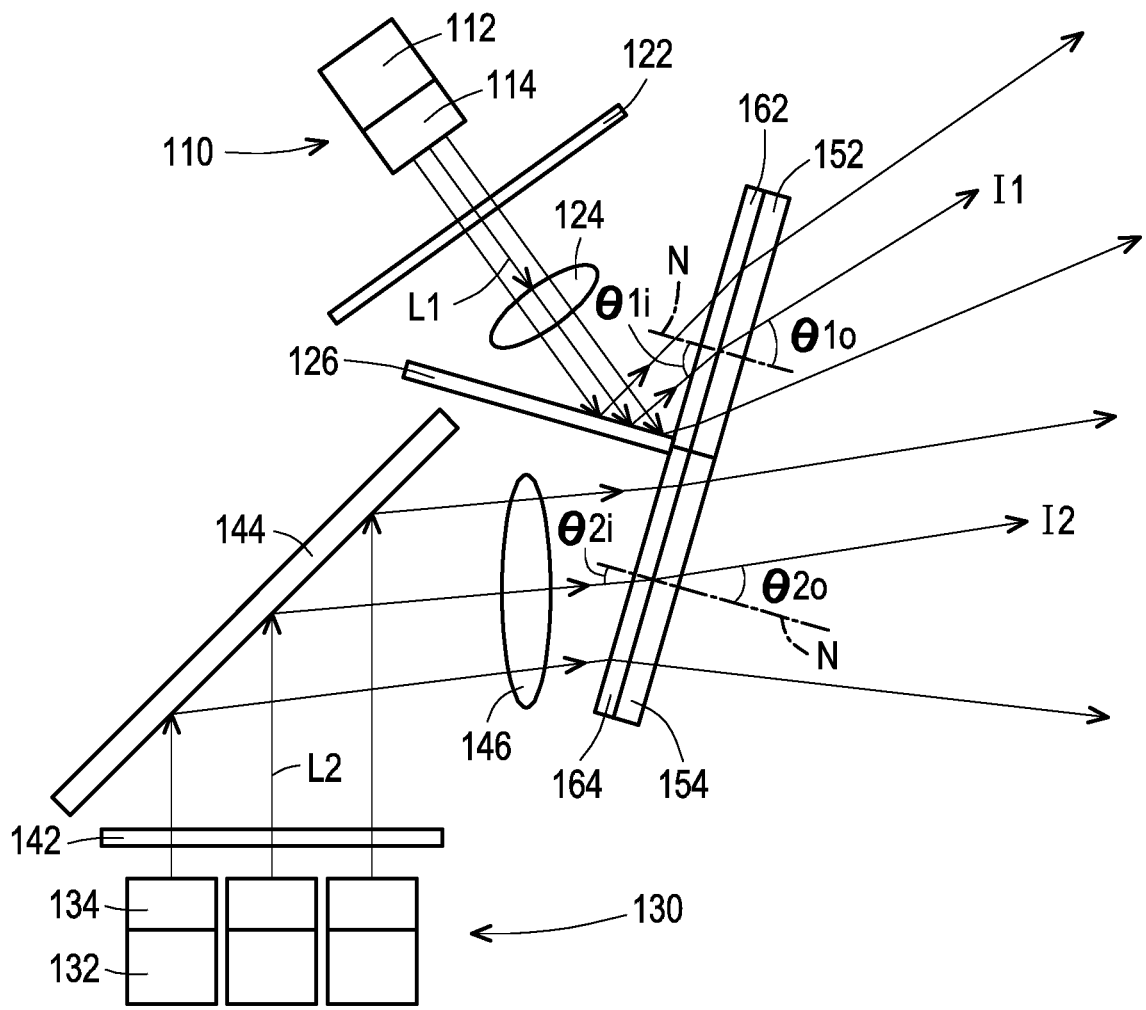
FIG. 1 is a schematic diagram of an image generation unit according to an embodiment of the disclosure.
Figure 2:
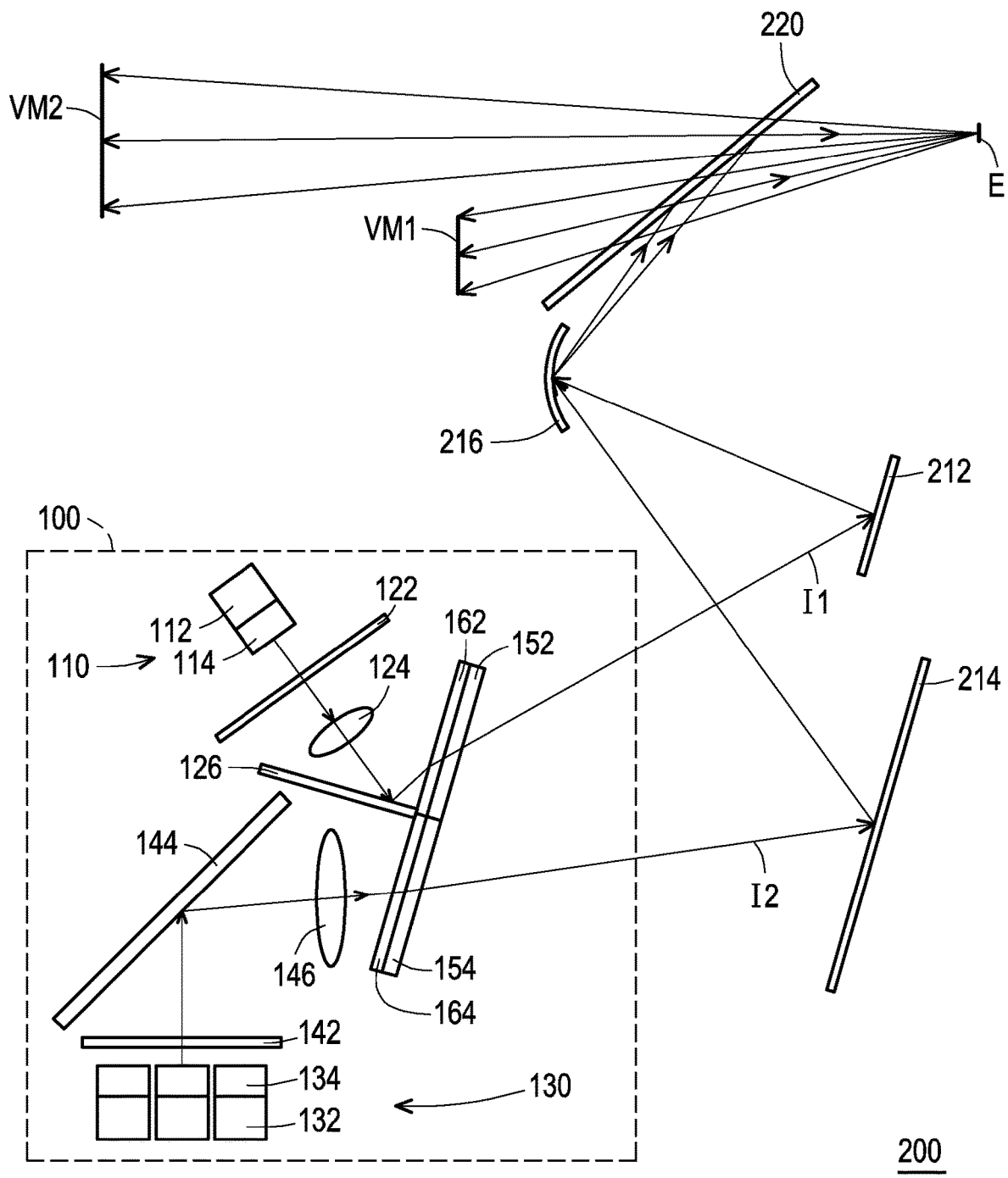
FIG. 2 is a schematic diagram of a head-up display according to an embodiment of the disclosure.

FIG. 1 is a schematic diagram of an image generation unit according to an embodiment of the disclosure. FIG. 2 is a schematic diagram of a head-up display according to an embodiment of the disclosure. Referring to FIGS. 1 and 2, an image generation unit 100 of a head-up display 200 provides a first image beam I1 and a second image beam I2, and the head-up display 200 projects the first image beam I1 and the second image beam I2 to a target element 220. In this embodiment, the head-up display 200 is, for example, used in vehicles such as automobiles. For example, the head-up display 200 is installed under the dashboard of the vehicle. The target element 220 is, for example, a windshield of the vehicle. The first image beam I1 and the second image beam I2 are reflected by the target element 220 (the windshield) to eyes E of the viewer (for example, the driver of the vehicle), such that the viewer may see a first virtual image VM1 and a second virtual image VM2 that are formed at different imaging distances and show different driving information in front of the target element 220 (windshield).

FIG. 1 is a schematic diagram of an image generation unit according to an embodiment of the disclosure. As shown in FIG. 1, the image generation unit 100 includes a display panel 150, a first illumination system 110 and a second illumination system 130. In the embodiment, the first illumination system 110 and the second illumination system 130 are arranged at the same side of the display panel. The display panel 150 includes a first imaging region 152 and a second imaging region 154 which are adjacently arranged to form an effective image region (not numbered) and corresponding to the first illumination system 110 and the second illumination system 130, respectively. The first imaging region 152 and the second imaging region 154 are located on a same plane (the effective image region) of the display panel 150 so as to provide different, the same or related image information respectively. In the embodiment, the display panel 150 may include, for example, a transmissive liquid crystal panels or other light beam modulators.

As shown in FIG. 1, the first illumination system 110 provides a first light beam L1, and the first imaging region 152 of the display panel 150 is located on the optical path of the first light beam L1. The first light beam L1 is incident on the first imaging region 152 of the display panel 150 at a first incident angle $\theta 1i$, and the first imaging region 152 of the display panel 150 converts the first light beam L1 into the first image beam I1. The second illumination system 130 provides a second light beam L2, and the second imaging region 154 of the display panel 150 is located on the optical path of the second light beam L2. The second light beam L2 is incident on the second imaging region 154 of the display panel 150 at a second incident angle $\theta 2i$, and the second imaging region 154 of the display panel 150 converts the second light beam L2 into the second image beam I2. Furthermore, the first incident angle $\theta 1i$ is the included angle between a direction of the first light beam L1 and a normal N of the plane of the display panel 150, and the second incident angle $\theta 2i$ is the included angle between a direction of the second light beam L2 and the normal N of the plane of the display panel 150.

As shown in FIG. 1, the first illumination system 110 includes a first light source 112, a collimator 114, and a light transmission assembly 120. The first light source 112 of the first illumination system 110 emits the first light beam L1. The first light beam L1 is guided by the collimator 114 and the light transmission assembly 120 in sequence to be incident on the first imaging region 152 of the display panel 150 by the collimator 114 and the light transmission assembly 120 in sequence.

According to some embodiments, the first light beam L1 may be monochromatic light or polychromatic light, but the disclosure is not limited thereto. According to some embodiments, the first light source 112 of the first illumination system 110 is one or more light emitting elements. The number of light-emitting elements may be determined according to requirements, which is not limited in the disclosure. According to some embodiments, the light-emitting element is a light-emitting diode or a laser diode, or other elements with similar properties; the disclosure is not limited thereto.

The collimator 114 of the first illumination system 110 is located on the optical path of the first light beam L1 emitted from the first light source 112 so as to collimate the first light beam L1. According to some embodiments, the divergence angle of the collimated first light beam L1 passing through the collimator 114 is smaller than 1°, but it may be other suitable angles according to system requirements; the disclosure is not limited thereto.

As shown in FIG. 1, the light transmission assembly 120 of the first illumination system 110 includes a lens 122, a lens 124 and a reflecting mirror 126. In this embodiment, the light transmission assembly 120 has two lenses and one reflecting mirror, but the number of lenses and reflecting mirrors may also be other suitable numbers according to system requirements; the disclosure is not limited thereto.

The first light beam L1 emitted by the first light source 112 passes through the collimator 114, the lens 122 and the lens 124 in sequence, and is transmitted to the reflecting mirror 126. Then the first light beam L1 is reflected by the reflecting mirror 126 to the first imaging region 152 of the display panel 150. By adjusting the configuration of the first light source 112, the collimator 114, and the light transmission assembly 120, especially the arrangement angle of the reflecting mirror 126, the light entrance angle of the first light beam L1 incident on the first imaging region 152 may be adjusted to be the first incident angle θ1i. In this embodiment, the reflecting mirror 126 is a flat reflecting mirror. In other embodiments, the optical elements of the light transmission assembly 120 may also have other combinations and arrangements; the disclosure is not limited thereto.

As shown in FIG. 1, the second illumination system 130 includes a second light source 132, a collimator 134, and a light transmission assembly 140. The second light source 132 of the second illumination system 130 emits the second light beam L2. The light beam L2 is guided by the collimator 134 and the light transmission assembly 140 in sequence to be incident on the second imaging region 154 of the display panel 150.

According to some embodiments, the second light beam L2 may be monochromatic light or polychromatic light; the disclosure is not limited thereto. According to some embodiments, the color of the second light beam L2 may be the same as the color of the first light beam L1, or may be different from the color of the first light beam L1; the disclosure is not limited thereto. According to some embodiments, the second light source 132 is one or more light emitting elements. The number of light-emitting elements may be determined according to requirements; the disclosure is not limited thereto. According to some embodiments, the number of light-emitting elements of the second light source 132 may be the same or different from the number of light-emitting elements of the first light source 1121 the disclosure is not limited thereto. According to some embodiments, the light-emitting element is a light-emitting diode or a laser diode, or other elements with similar properties; the disclosure is not limited thereto.

The collimator 134 of the second illumination system 130 is located on the optical path of the second light beam L2 from the second light source 132 so as to collimate the second light beam L2. According to some embodiments, the divergence angle of the collimated second light beam L2 passing through the collimator 134 is smaller than 1°, but it may be other suitable angles according to system requirements; the disclosure is not limited thereto.

As shown in FIG. 1, the light transmission assembly 140 of the second illumination system 130 includes a lens 142, a reflecting mirror 144, and a lens 146. In this embodiment, the light transmission assembly 140 has two lenses and one reflecting mirror, but the number of lenses and reflecting mirrors may also be other suitable numbers according to system requirements; the disclosure is not limited thereto.

The second light beam L2 emitted by the second light source 132 passes through the collimator 134 and the lens 142 in sequence, and is reflected by the reflecting mirror 144 to be transmitted to the lens 146. The second light beam L2 passing through the lens 146 is incident on the second imaging region 154 of the display panel 150. By adjusting the configuration of the second light source 132, the collimator 134, and the light transmission assembly 140, the light entrance angle of the second light beam L2 incident on the second imaging region 154 may be adjusted to be the second incident angle θ2i. In other embodiments, the optical elements of the light transmission assembly 140 may also have other combinations and arrangements; the disclosure is not limited thereto.

The optical path of the first light beam L1 from the first light source 112 to be incident on the first imaging region 152 does not intersect with the optical path of the second light beam L2 from the second light source 132 to be incident on the second imaging region 154, and the first image beam I1 and the second image beam I2 leave the display panel 150 at a first light exit angle θ1o and a second light exit angle θ2o, respectively. The first light exit angle θ1o and the second light exit angle θ2o are the included angles between the directions in which the first light beam L1 and the second light beam L2 leave the display panel 150 and the normal N of the plane of the display panel 150.

Since the first incident angle θ1i of the first light beam L1 incident on the first imaging region 152 is different from the second incident angle θ2i of the second light beam L2 incident on the second imaging region 154, the optical path of the first light beam L1 does not interfere with the second light beam L2, such that the first light beam L1 would not be incident on the second imaging region 154 and the second light beam L2 would not be incident on the first imaging region 152. There are no unnecessary stray light and ghost images in subsequent images.

Therefore, as shown in FIG. 1, the reflecting mirror 126 of the light transmission assembly 120 of the first illumination system 110 is disposed between the first illumination system 110 and the second illumination system 130, such that the optical path of the first light beam L1 incident on the first imaging region 152 does not interfere with the optical path of the second light beam L2 incident on the second imaging region 154. The reflecting mirror 126 is disposed between the two illumination systems, for example, by connecting with a casing (not shown) fixed to the head-up display. In more detail, the reflecting mirror 126 is, for example, disposed on one side of the display panel 150, and may be inclined relative to the plane of the display panel 150 according to the actual optical path, such that the first light beam L1 is incident on the first imaging region 152 of the display panel 150 at the first incident angle θ1i. With the configuration of the reflecting mirror 126, the interference between the optical paths of the first light beam L1 and the second light beam L2 the first imaging region 152 and the second imaging region 154 can be effectively blocked; at the same time, the configuration of the reflecting mirror of the first illumination system 110 is also provided, so as to meet the restriction of first incident angle θ1$i$ of the first light beam L1 emitted by the first illumination system 110 required by the first imaging region 152.

According to some embodiments, the reflective surface of the reflecting mirror 126 may reflect the first light beam L1, and the other surface of the reflecting mirror 126, that is, the opposite surface of the reflective surface of the reflecting mirror 126, has a light absorbing element to absorb the second light beam L2 incident on the reflecting mirror, so as to prevent the stray light generated in the second illumination system 130 from entering the first illumination system 110 or entering the first imaging region 152 of the display panel 150.

According to some embodiments, the display panel 150 is a liquid crystal display panel 150, or other elements having similar functions. The first imaging region 152 and the second imaging region 154 of the display panel 150 provide different image information, for example, such that the first virtual image VM1 and the second virtual image VM2 respectively formed by the first image beam I1 and the second image beam I2 may present different driving information in front of the target element 220 (the windshield). According to some embodiments, the first virtual image VM1 formed by the first image beam I1 may show fixed driving information, such as vehicle speed, fuel level, mileage, and speed limit, and the second virtual image VM2 formed by the second image beam I2 may show driving information according to road conditions, such as left and right turn symbols, landmark information, warning symbols, or the like; the disclosure is not limited thereto.

The image generation unit 100 further includes a diffuser 160, and the diffuser 160 is located on the optical path of the first light beam L1 incident on the first imaging region 152 and the optical path of the second light beam L2 incident on the second imaging region 154. The diffuser 160 is disposed on the plane (a light entrance surface) of the display panel 150. According to some embodiments, the image generation unit 100 may not need to include the diffuser 160; the disclosure is not limited thereto.

As shown in FIG. 1, the diffuser 160 includes a first diffuser 162 and a second diffuser 164. The first diffuser 162 corresponds to the first imaging region 152 of the display panel 150 and is disposed on the first imaging region 152 of the display panel 150, and the first light beam L1 is transmitted to the first imaging region 152 after passing through the first diffuser 162. The second diffuser 164 corresponds to the second imaging region 154 of the display panel 150 and is disposed on the second imaging region 154 of the display panel 150, and the second light beam L2 is transmitted to the second imaging region 154 after passing through the second diffuser 164. With the first diffuser 162 and the second diffuser 164, the uniformity and quality of the first light beam L1 passing through the first diffuser 162 and the second light beam L2 passing through the second diffuser 164 can be improved respectively. According to some embodiments, the first diffuser 162 and the second diffuser 164 have the same or different hazes so as to generate the same or different diffusing abilities according to actual requirements. Moreover, in other embodiments, the first diffuser 162 may be disposed between the first light source 112 and the first imaging region 152 of the display panel 150, and the second diffuser 164 may be disposed between the second light source 132 and the display panel 150 of the second imaging region 154.

According to the image generation unit 100 shown in FIG. 1, with two illumination systems, two different image beams may be generated simultaneously from one single display panel 150 having two imaging regions, and the size of the image generation unit and reduce costs can be effectively reduced. Further, by the arrangement of the reflecting mirror 126, the optical paths of the first light beam L1 and the second light beam L2 may be made non-intersecting, so as to avoid the interference between the first light beam L1 and the second light beam L2. In some embodiments, the number of illumination systems may be greater than two, and the number of imaging regions may be greater than two, so as to generate more virtual images.

FIG. 2 is a schematic diagram of a head-up display according to an embodiment of the disclosure. To simplify the drawing, the first image beam I1 and the second image beam I2 are only shown in the transmission direction along the optical axis.

As shown in FIG. 2, the head-up display 200 includes the image generation unit 100, an image transmission module 210 and the target element 220. The first image beam I1 and the second image beam I2 emitted by the image generation unit 100 are projected onto the target element 220. The first image beam I1 and the second image beam I2 are reflected by the target element 220 to the eyes E of the viewer, such that the viewer sees the first virtual image VM1 and the second virtual image VM2 that are formed at different imaging distances and show different image information in front of the target element 220.

The image transmission module 210 of the head-up display 200 transmits the first image beam I1 and the second image beam I2 from the image generation unit 100 to the target element 220 so as to form the first virtual image VM1 and the second virtual image VM2 respectively.

As shown in FIG. 1 and FIG. 2, the first image beam I1 and the second image beam I2 from the image generation unit 100 leave the display panel 150 of the image generation unit 100 at the first light exit angle θ1$o$ and the second light exit angles θ2$o$ that are different from each other, and are incident on the image transmission module 210. As shown in FIG. 2, the image transmission module 210 includes an imaging mirror set 212, an imaging mirror set 214, and a curved mirror 216. The imaging mirror set 212 and the imaging mirror set 214 are respectively located on the optical paths of the first image beam I1 and the second image beam I2. The number and position of the lenses or mirrors of the image transmission module 210 may be adjusted according to requirements, and the disclosure is not limited thereto.

As shown in FIG. 1 and FIG. 2, the imaging mirror set 212 has, for example, a reflecting mirror, and the imaging mirror set 214 has, for example, a reflecting mirror. The first image beam I1, after leaving the image generation unit 100, is reflected by the reflecting mirror (the imaging mirror set 212) and then is incident on the curved mirror 216. The second image beam I2, after leaving the image generation unit 100, is reflected by the reflecting mirror (the imaging mirror set 214) and then is incident on the curved mirror 216. Since the head-up display 200 is configured with only one display panel 150, the first light beam L1 is incident on the first imaging region 152 at the first incident angle θ1$i$ relative to the normal N of the display panel 150, and the second light beam L2 is incident on and the second imaging region 154 at the second incident angle θ2$i$ relative to the normal N of the display panel 150. Further, the first image beam I1 and the second image beam I2 respectively leave at the first light exit angle θ1$o$ and the second light exit angle θ2$o$ relative to the normal N of the display panel 150. Through the above angle design, the first image beam I1 and the second image beam I2 emitted from the same display panel 150 may be transmitted to the corresponding imaging mirror sets 212 and 214 respectively.

According to some embodiments, the curved mirror 216 may be a free-form mirror, but the disclosure is not limited thereto. The curved mirror 216 receives the first image beam I1 from the imaging mirror set 212 and the second image beam I2 from the imaging mirror set 214. The first image beam I1 and the second image beam I2 are respectively transmitted to the target element 220 by the curved mirror 216 so as to correspondingly form the first virtual image VM1 and the second virtual image VM2. Because the transmission distances of the first image beam I1 and the second image beam I2 in the image transmission module 210 after being emitted from the display panel 150 are different, the first virtual image VM1 and the second virtual image VM2 have different imaging distances relative to the target element 220. In more detail, by the image transmission module 210, the optical path length of the first image beam I1 from the image generation unit 100 to the position of the first virtual image VM1 formed by the first image beam I1 is greater than the optical path length of the second image beam I2 from the image generation unit 100 to the position of the second virtual image VM2 formed by the second image beam I2. In other embodiments, the imaging mirror set 212 has, for example, a plurality of reflecting mirrors; the imaging mirror set 214 has, for example, a plurality of reflecting mirrors; and the number of reflecting mirrors of the imaging mirror set 212 and the imaging mirror set 214 may be different. As long as the transmission distances of the first image beam I1 and the second image beam I2 between the image transmission module 210 and the display panel 150 are different, the disclosure does not limit the number of reflecting mirrors.

Figure 3:
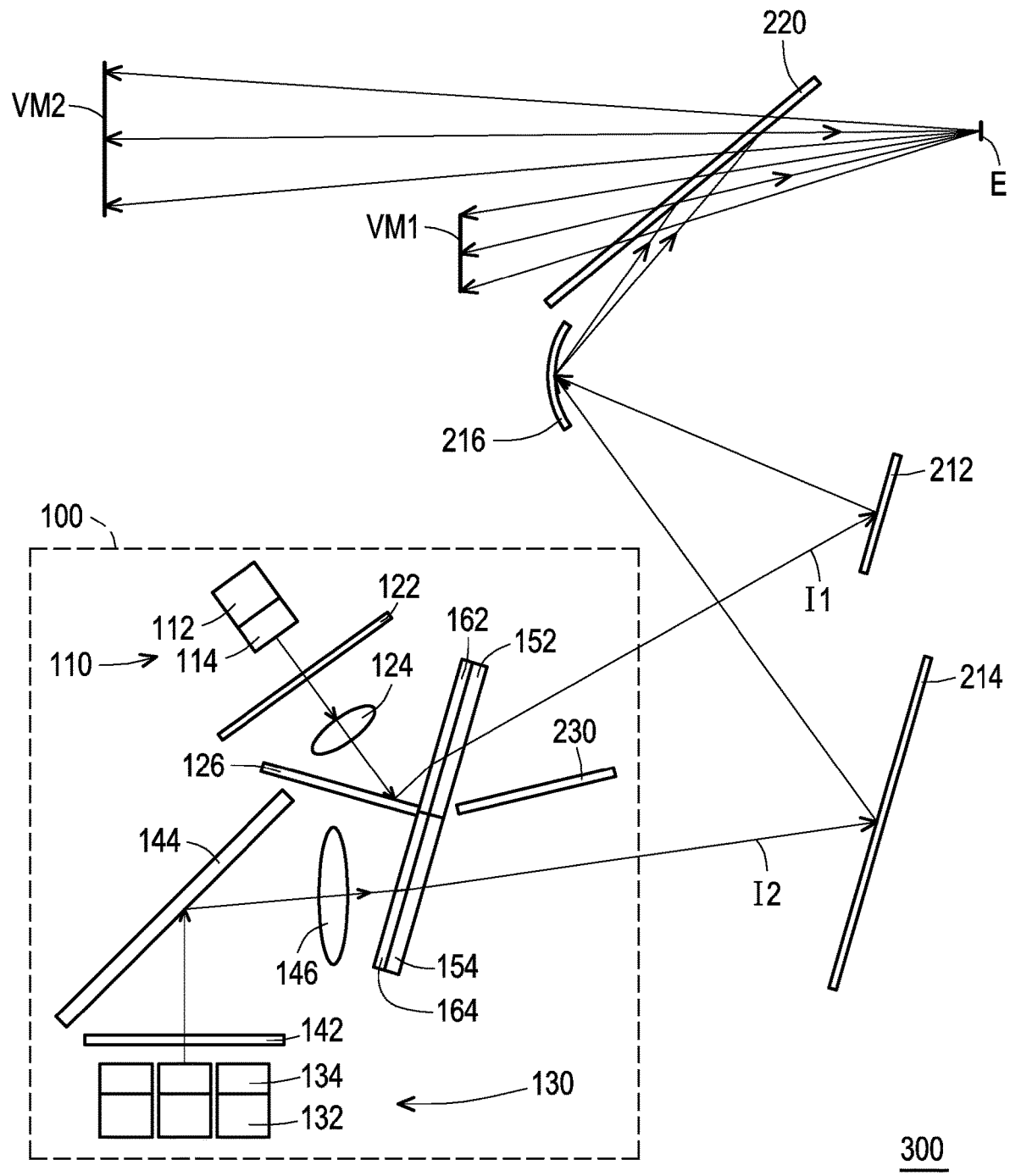
FIG. 3 is a schematic diagram of a head-up display according to another embodiment of the disclosure.

FIG. 3 is a schematic diagram of a head-up display according to another embodiment of the disclosure. To simplify the drawing, the first image beam I1 and the second image beam I2 are only shown in the transmission direction along the optical axis. A head-up display 300 of FIG. 3 is similar to the head-up display 200 of FIG. 2, and the main differences are as follows. In this embodiment, the head-up display 300 further includes an optical element 230 located between the image generation unit 100 and the imaging mirror set 212 and the imaging mirror set 214.

When the optical path of the first image beam I1 and the second image beam I2 interfere with each other in the optical path of the head-up display, the eyes E of the users will see stray light. At the same time, the viewer may also see part of the second virtual image VM2 in the first virtual image VM1, or part of the first virtual image VM1 in the second virtual image VM2. In order to prevent the first image beam I1 from interfering with the second image beam I2 on the imaging system of the head-up display 200, the first light beam L1 for generating the first image beam I1 and the second light beam L2 for generating the second image beam I2 are separated by the reflecting mirror 126. Due to the structural design of the head-up display, the first image beam I1 leaving the image generation unit 100 may still interfere with the second image beam I2 leaving the image generation unit 100. Therefore, the optical element 230 of the head-up display 300 is configured to separate the first image beam I1 and the second image beam I2, such that the first image beam I1 does not transmit to the imaging mirror set 214, and the second image beam I2 does not transmit to the imaging mirror set 212, so as to ensure that the first virtual image VM1 and the second virtual image VM2 do not have stray light interfering with each other and that the imaging quality is improved.

According to some embodiments, the material of the optical element 230 is a material having light absorbing properties. Moreover, the position or shape of the optical element 230 may be changed according to the design of the imaging system, so as to achieve the purpose of separating the first image beam I1 and the second image beam I2. The disclosure does not limit the position or shape of the optical element 230.

According to other embodiments, the optical element 230 may also be a material having polarized light properties, such as a polarizer. As long as a polarized light transmission direction of the display panel (display panel 150 of FIG. 1) and a polarized light transmission direction of the optical element 230 are perpendicular (ex. the included angle is 90 degrees), the effect of shielding the stray light of the first image beam I1 and the second image beam I2 can also be achieved. In this embodiment, the optical element 230 and the reflecting mirror 126 are respectively disposed on opposite sides of the display panel 150, and may be disposed adjacent to the display panel 150. In the embodiment of FIG. 3, the reflecting mirror 126 is, for example, connected to the display panel 150 and is located between the two imaging regions, and the optical element 230 is disposed adjacent to the display panel 150; the disclosure is not limited thereto as long as the design prevents the two light beams or the two image beams from interfering with each other.

To sum up, by the arrangement of two illumination systems, the image generation unit of the disclosure is capable of simultaneously providing illumination light beams to two imaging regions of one display panel. Therefore, the size and cost of the image generation unit can be effectively reduced, and the two virtual images displayed by the head-up display can have better imaging quality.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An image generation unit, comprising: a display panel, a first illumination system, and a second illumination system, wherein
    the display panel has a first imaging region and a second imaging region which are adjacently arranged and located on a same plane thereof;
    the first illumination system provides a first light beam which is incident on the first imaging region of the display panel at a first incident angle, and the first imaging region converts the first light beam into a first image beam; and
    the second illumination system provides a second light beam which is incident on the second imaging region of the display panel at a second incident angle, and the second imaging region converts the second light beam into a second image beam,
    wherein the first image beam and the second image beam leave the display panel at different light exit angles;
    wherein a light transmission assembly of the first illumination system comprises a reflecting mirror, and the reflecting mirror is disposed between the first illumination system and the second illumination system, such that an optical path of the first light beam incident on the first imaging region does not intersect with an optical path of the second light beam incident on the second imaging region,
    wherein the reflecting mirror comprises a reflective surface to reflect the first light beam and a surface opposite to the reflective surface, wherein the opposite surface comprises a light absorbing element to absorb the second light beam incident on the reflecting mirror.

2. The image generation unit according to claim 1, wherein the first incident angle and the second incident angle are different.

3. The image generation unit according to claim 1, wherein the first illumination system comprises: a first light source, a collimator, and the light transmission assembly, wherein the first light beam is emitted from the first light source and is guided by the collimator and the light transmission assembly in sequence, and then the first light beam is incident on the first imaging region.

4. The image generation unit according to claim 3, wherein the first light beam emitted by the first light source is guided by the collimator and the light transmission assembly in sequence, and is transmitted to the reflecting mirror, and the first light beam is reflected to the first imaging region by the reflecting mirror.

5. The image generation unit according to claim 3, wherein the first light source is one or more light-emitting elements, and the light-emitting element is a light-emitting diodes or a laser diode.

6. The image generation unit according to claim 1, wherein the second illumination system comprises: a second light source, a collimator, and a light transmission assembly, wherein the second light beam is emitted from the second light source and is guided by the collimator and the light transmission assembly in sequence, and then the second light beam is incident on the second imaging region.

7. The image generation unit according to claim 6, wherein the second light source is one or more light-emitting elements, and the light-emitting element is a light-emitting diode or a laser diode.

8. The image generation unit according to claim 1, wherein the display panel is a liquid crystal display panel.

9. The image generation unit according to claim 1, further comprising:
    a diffuser, disposed on the display panel and located on the optical path where the first light beam is incident on the first imaging region and the optical path where the second light beam is incident on the second imaging region.

10. The image generation unit according to claim 9, wherein the diffuser is disposed on a light entrance surface of the display panel.

11. The image generation unit according to claim 1, further comprising:
    a first diffuser, disposed on the first imaging region of the display panel; and
    a second diffuser, disposed on the second imaging region of the display panel, wherein the first diffuser and the second diffuser have different diffusing abilities, the first light beam is transmitted to the first imaging region after passing through the first diffuser, and the second light beam is transmitted to the second imaging region after passing through the second diffuser.

12. A head-up display, projecting a first image beam and a second image beam onto a target element, comprising:
    an image generation unit, the image generation unit comprising: a display panel, a first illumination system, and a second illumination system; wherein,
    the display panel has a first imaging region and a second imaging region which are adjacently arranged and located on a same plane;
    the first illumination system provides a first light beam which is incident on the first imaging region of the display panel at a first incident angle, and the first imaging region converts the first light beam into the first image beam; and
    the second illumination system provides a second light beam which is incident on the second imaging region of the display panel at a second incident angle, and the second imaging region converts the second light beam into the second image beam;
    wherein the first image beam and the second image beam leave the display panel at different light exit angles;
    wherein a light transmission assembly of the first illumination system comprises a reflecting mirror, the reflecting mirror is disposed between the first illumination system and the second illumination system, such that an optical path of the first light beam incident on the first imaging region does not intersect with an optical path of the second light beam incident on the second imaging region;
    wherein the reflecting mirror comprises a reflective surface to reflect the first light beam and a surface opposite to the reflective surface, wherein the opposite surface comprises a light absorbing element to absorb the second light beam incident on the reflecting mirror; and
    an image transmission module, transmitting the first image beam and the second image beam from the image generation unit to the target element so as to form a first virtual image and a second virtual image, respectively.

13. The head-up display according to claim 12, wherein the first virtual image and the second virtual image have different image information and are formed at different imaging distances relative to the target element.

14. The head-up display according to claim 12, wherein the first image beam and the second image beam have different transmission distances in the image transmission module, and the image transmission module comprises a curved mirror.

15. The head-up display according to claim 12, wherein the first illumination system comprises: a first light source, a collimator, and the light transmission assembly, wherein the first light beam is emitted from the first light source and is guided by the collimator and the light transmission assembly in sequence, and then the first light beam is incident on the first imaging region.

16. The head-up display according to claim 15, wherein the first light beam emitted by the first light source is guided by the collimator and the light transmission assembly in sequence, and is transmitted to the reflecting mirror, and the first light beam is reflected to the first imaging region by the reflecting mirror.

17. The head-up display according to claim 12, wherein the second illumination system comprises: a second light source, a collimator, and a light transmission assembly, wherein the second light source emits the second light beam and the second light beam is guided by the collimator and the light transmission assembly in sequence, and then is incident on the second imaging region.

18. The head-up display according to claim 12, wherein the image generation unit further comprises:
- a first diffuser, disposed on the first imaging region of the display panel; and
- a second diffuser, disposed on the second imaging region of the display panel, wherein the first diffuser and the second diffuser have different diffusing abilities, the first light beam is transmitted to the first imaging region after passing through the first diffuser, and the second light beam is transmitted to the second imaging region after passing through the second diffuser.

* * * * *